May 23, 1950     E. PELL     2,508,771
CONTROLLER FOR SLIP RING ALTERNATING CURRENT MOTORS
Filed March 4, 1946
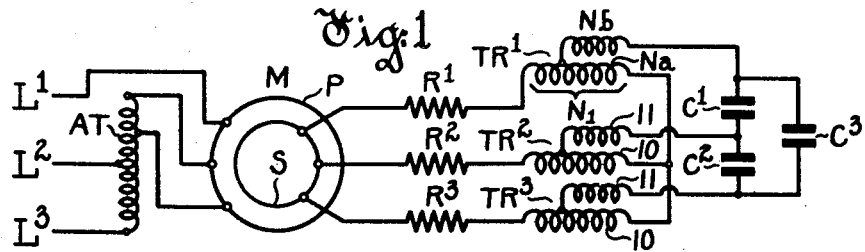

Patented May 23, 1950

2,508,771

UNITED STATES PATENT OFFICE 2,508,771

CONTROLLER FOR SLIP-RING ALTERNATING CURRENT MOTORS

Eric Pell, Shorewood, Wis., assignor to Cutler-Hammer, Inc., Milwaukee, Wis., a corporation of Delaware Application March 4, 1946, Serial No. 651,904

4 Claims. (Cl. 318—239)

This invention relates to controllers for slip ring alternating current motors.

In my copending application Serial No. 581,090, filed March 5, 1945, now abandoned, there is disclosed a controller especially advantageous for slip ring motors employed in winch service or other hoist service where overhauling loads are encountered, such controller comprising voltage unbalancing means for the motor primary and further comprising capacitors, reactors and resistors affording automatic variation of the impedance of the positive and negative sequence components of the motor secondary current as a function of variations in frequency to afford the motor a more stable slow speed in load lowering. Capacitors as a function of difference in frequencies of the two sequence components affect lowering of the impedance and raising of the power factor of the negative sequence hoisting component while increasing the impedance and decreasing the power factor of the positive sequence lowering component, the purpose of the reactors being to sharpen the tuning for such discrimination between the two sequence currents. The inductive drop of the series connected reactors also serves to increase the voltage and efficiency of the capacitors, and the present invention has among its objects to improve the aforementioned type of controller, and particularly to afford more efficient use of the capacitors.

Commercial capacitors are ordinarily built for certain ratings, continuous duty, and since such capacitors can withstand considerably higher voltage on a crane duty cycle full utilization of the capacitors requires secondary voltages of higher than the usual value. Moreover, motor manufacturers have not standardized on secondary voltages for slip ring motors, which fact adds to the problem of full utilization of capacitors in the relation mentioned, and the present invention has for an object to provide for raising the secondary voltage to a value suited to the capacitors employed, thereby to enable full use of such capacitors.

Addition to the controller aforementioned of separate transformers would enable the secondary voltage to be raised as desired, but such addition would be highly objectionable in respect of the resulting increase in cost and weight of the control equipment, and the present invention has as an object to provide combined transformer and reactor units which save both cost and weight and otherwise are more advantageous than the separate reactors and transformers which would be required.

Other objects and advantages of the present invention will hereinafter appear.

The accompanying drawing illustrates certain embodiments of the invention which will now be described, it being understood that the embodiments illustrated are susceptible of various modifications without departing from the scope of the appended claims.

In the drawings, Figure 1 shows diagrammatically a motor controller suitable for a low ratio transformation (high motor voltage).

Fig. 2 shows a modification of Fig. 1 for a high ratio of transformation (low motor voltage).

Fig. 3 is a side elevational view of a combined transformer and reactor.

Fig. 4 is a top plan view of Fig. 3.

Fig. 5 is an end elevational view of Fig. 3, and

Fig. 6 is a diagrammatic view of the windings of the combined transformer and reactor, showing the taps thereof.

Referring to the combined transformer and reactor shown in Figs. 3 to 5, and hereinafter referred to as transformer-reactor unit TR, the same comprises winding sections 10 and 11 mounted in a side by side relation on laminated cores 12 and 13, respectively, which cores have their extremities clamped in generally rectangular frames 14 and 15 of well known form. Each frame comprises side bars and end bars to be secured together at the corners of the frame by bolts 16. Also rods 17 provided at opposite ends with clamping nuts are preferably passed through the side bars and the core 13.

Essentially the unit TR is an autotransformer with a split winding, all or part of the winding section 10 being the primary, and the winding section 11 being all or part of the secondary, each of said windings having a number of taps, as best shown in Fig. 6. The total number of used turns in the primary or autotransformer section 10 depends upon the slip ring voltage applied thereto and the number of used turns in the winding section 11 depends upon the leakage reactance required, whereas the selected autotransformer tap in conjunction with the number of used turns of winding section 11 determines the secondary voltage for the capacitor to be associated therewith.

The laminations of core 13 of the winding section 11 have at their opposite ends right angle extensions 13$^a$ extending to core 12 and also oppositely projecting shorter extensions 13$^b$. A laminated leg 18 is mounted in the clamping supports 14 and 15 in parallel relation with the core 13 and in spaced relation with the end portion 13$^b$ of core 13, to provide a magnetic leakage path including definite gaps 19 and 20 which are adjustable by adjustment of the leg 18 relative to the end portions 13b of core 13. The gaps 19 and 20 may be air gaps but preferably they have non-metallic fillers 21 acting as spacers between the core 13 and leg 18 whereby the aforesaid adjustment may be effected by varying the thickness of the spacers thus provided.

The number of turns and the current (ampere turns) of the winding section surrounding the core 13 determines the magneto-motive force of the main leakage flux. Part of this flux passes through the air from one end of the frame to the other but the main portion passes through the leg 18 and the aforementioned non-metallic gaps 19 and 20.

The aforementioned taps (Fig. 6) of the winding sections afford the coarser adjustments of the unit, while the finer adjustments are afforded by adjustment of the gaps 19 and 20 in the magnetic leakage path.

The unit TR may be stocked for given size motors and capacitors, except for the primary winding section 10, which in each case must be suited to the secondary voltage of the motor. With the primary winding section always designed for the same flux density, the reactance, when referred to the secondary of the transformer, would then remain the same for a given secondary winding section and capacitor. Any variations due to manufacturing tolerances or other inequalities could be compensated by adjustment of the gaps 19 and 20 in the magnetic leakage path.

Referring to Fig. 1, it shows an induction motor M having a primary P with its terminal $T^1$ connected to supply line $L^1$ and with its terminals $T^2$ and $T^3$ connected to an auto-transformer AT which has connections to supply lines $L^2$ and $L^3$ and which effects voltage unbalance of the motor primary in a well known way. The motor has a secondary S the circuit of which has in its different phases resistors $R^1$, $R^2$ and $R^3$ and also the primary winding sections 10 of transformer-reactor units $TR^1$, $TR^2$ and $TR^3$ to which are connected capacitors $C^1$, $C^2$ and $C^3$ through the secondary winding sections 11 of said units $TR^1$, $TR^2$ and $TR^3$. The interconnections between the winding sections 10 and 11 of the TR units are in this instance individually the same as that shown in Fig. 6 and a suitable number of turns of windings 11 are included, these connections as aforeindicated being selected for low ratio transformation (high motor voltage). For a high ratio transformation (low motor voltage) the connections may be modified as shown in Fig. 2 wherein the connections between resistors and winding sections 10 are made to taps on said winding sections and wherein the connections to the capacitors include in series relation turns of winding sections 11 and turns of the overhanging portions of winding sections 10.

If $$\frac{N_1}{Na \times Nb} = a$$

is the ratio of transformation, the expression for the reactance is substantially $$X = \frac{a^2 \times Nb^2 \times C}{R_0}$$

where C is a constant and $R_0$ is the total magnetic reluctance of the leakage paths; X referred to the primary side of the transformer. With $N_1$ fixed by the primary voltage and flux density and $a$ fixed by the required capacitor voltage, the desired reactance X is obtained by allocating properly the secondary turns between the sections Na and Nb. For a given flux density reactance and capacitance, the sections Nb and Na remain substantially fixed, with the total number of turns $N_1$ varied in accordance with the primary voltage.

The transformer magnetizing current of the negative sequence braking component which is of relatively high frequency is consequently small in comparison to that of the positive sequence driving component, and thus has little effect on the braking torque, whereas the power factor and torque of the positive component is materially reduced because of the magnetizing current, especially in the region of higher subsynchronous speeds and low positive sequence frequency. This results in a somewhat greater net braking torque and lower speed than can be obtained with like utilization of the capacitors without the transformer action afforded by units TR.

What I claim as new and desire to secure by Letters Patent is:

1. The combination with a slip ring motor, of capacitors in circuit with the secondary of said motor to afford said motor greater stability of a selected speed, and combination transformer and reactor units to accentuate the action of said capacitors, said units affording step up of the motor secondary voltage to which said capacitors are subjected, each of said units comprising essentially a split winding autotransformer having a suitable magnetic leakage path, one section of the split winding having subjected to the voltage of the motor secondary a number of its turns selected according to the value of such voltage, and a second section of said winding having, according to the leakage reactance desired, a selected number of its turns interconnected with the first mentioned winding section to afford the desired voltage step up.

2. The combination with a slip ring motor, means to subject the primary of said motor to voltage unbalance resulting in positive and negative sequence components of the motor secondary current which provide for holding the motor down to a slow speed under overhauling load conditions, capacitors connected to the motor secondary to render more stable such slow speed of said motor and combination transformer and reactor units to accentuate the action of said capacitors, each of said units comprising essentially a split winding autotransformer having a suitable magnetic leakage path, one section of said split winding having subjected to the voltage of the motor secondary a number of its turns selected according to the value of such voltage, and a second section of said winding having the number of its active turns selected according to the leakage reactance desired and having such selected turns interconnected with the first mentioned winding section to afford a given step up in the motor secondary voltage for capacitor application.

3. For each phase of the secondary circuit of a slip ring motor, a capacitor and a transformer-reactor unit associated with said capacitor for coaction therewith as a motor speed stabilizer, said unit comprising a laminated magnetic frame and interconnected winding sections on said frame to provide essentially an autotransformer of split winding type, the number of used turns of one winding section being suited to the motor slip ring voltage, and another of said winding sections having a number of active turns selected according to the leakage reactance desired, said magnetic frame having a part adjustable to afford an adjustable non-metallic gap for fine adjustment of a leakage path through said frame.

4. As means to provide for greater speed stability of a slip ring motor, a capacitor for each phase of the motor slip ring circuit and a transformer-reactor unit associated with each capacitor to provide a capacitive reactive circuit of higher voltage than the slip ring voltage of the motor, said unit comprising winding sections and a magnetic frame therefor having an adjustable part forming a leakage path including a non-metallic gap variable by adjustment of said part and said unit constituting essentially an auto-transformer of split winding type with a winding section for connection to a motor slip ring and another winding section for connection to a capacitor, the latter winding section being such that with a given flux density it affords approximately the desired leakage reactance, and the former winding section being suited to the motor slip ring voltage to provide such given flux density.

ERIC PELL.

REFERENCES CITED

The following references are of record in the file of this patent:

UNITED STATES PATENTS

| Number | Name | Date |
|---|---|---|
| 591,268 | Bradley | Oct. 5, 1897 |
| 660,911 | Lamme | Oct. 30, 1900 |
| 854,831 | Mershon | May 28, 1907 |
| 1,304,294 | Fortescue | May 20, 1919 |
| 1,676,312 | Alexanderson | July 10, 1928 |
| 1,708,910 | Spencer | Apr. 9, 1929 |
| 2,175,928 | Steinart | Oct. 10, 1939 |
| 2,420,192 | Rathbun | May 6, 1947 |
| 2,436,302 | Hyde et al. | Feb. 17, 1948 |

FOREIGN PATENTS

| Number | Country | Date |
|---|---|---|
| 102,902 | Austria | Nov. 15, 1925 |
| 132,575 | Great Britain | Sept. 15, 1919 |
| 283,678 | Italy | Mar. 18, 1931 |
| 754,103 | France | Aug. 21, 1933 |